(12) United States Patent
Dortschy et al.

(10) Patent No.: US 12,490,207 B2
(45) Date of Patent: Dec. 2, 2025

(54) IAB CASE-6 TIMING AND ADJUSTMENT

(71) Applicant: Telefonaktiebolaget LM Ericsson (publ), Stockholm (SE)

(72) Inventors: Boris Dortschy, Vendelsö (SE); Zhipeng Lin, Nanjing Jiangsu (CN); Behrooz Makki, Pixbo (SE); Lei Bao, Gothenburg (SE); Magnus Åström, Lund (SE); Thomas Chapman, Solna (SE); Jose Luis Pradas, Stockholm (SE); Chunhui Zhang, Stockholm (SE); Muhammad Ali Kazmi, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 321 days.

(21) Appl. No.: 18/261,780

(22) PCT Filed: Jan. 17, 2022

(86) PCT No.: PCT/EP2022/050917
§ 371 (c)(1),
(2) Date: Jul. 17, 2023

(87) PCT Pub. No.: WO2022/152913
PCT Pub. Date: Jul. 21, 2022

(65) Prior Publication Data
US 2024/0080782 A1    Mar. 7, 2024

(30) Foreign Application Priority Data

Jan. 18, 2021 (WO) .............. PCT/CN2021/072487

(51) Int. Cl.
*H04W 56/00* (2009.01)
*H04W 72/231* (2023.01)

(52) U.S. Cl.
CPC ....... *H04W 56/001* (2013.01); *H04W 72/231* (2023.01)

(58) Field of Classification Search
CPC ..................... H04W 56/001; H04W 72/231
See application file for complete search history.

(56) References Cited

U.S. PATENT DOCUMENTS

| 12,010,659 B2 * | 6/2024 | Abedini ........... H04W 56/0035 |
| 2020/0100298 A1 | 3/2020 | Pan et al. |
| 2024/0048227 A1 * | 2/2024 | Leng ................ H04W 56/0045 |

OTHER PUBLICATIONS

International Search Report and Written Opinion dated Apr. 25, 2022 for International Application No. PCT/EP2022/050917 filed Jan. 17, 2022, consisting of 15-pages.

(Continued)

*Primary Examiner* — Kyaw Z Soe
(74) *Attorney, Agent, or Firm* — Weisberg I.P. Law, P.A.

(57) ABSTRACT

A method, system and network node are disclosed. According to one or more embodiments, a parent network node configured to communicate with a network node is provided. The parent network node is configured to, and/or includes a radio interface and/or includes processing circuitry configured to: enable a first timing configuration, wherein the first timing configuration enables downlink transmission timing for the network node to be aligned with the downlink transmission timing of the parent network node; and based on the first timing configuration, switch to a second timing configuration, wherein the second timing configuration enables uplink transmission timing of the network node to be aligned with the downlink transmission timing of the network node.

20 Claims, 13 Drawing Sheets

(56) References Cited

OTHER PUBLICATIONS

3GPP TSG RAN Meeting #86 RP-193251 (revision of RP-193145); Title: New WID on Enhancements to Integrated Access and Backhaul; Agenda Item: 9.1.2; Source: Qualcomm; Document for: Approval; Date and Location: Dec. 9-12, 2019, Sitges, Spain, consisting of 5-pages.
3GPP TSG RAN meeting #87e RP-200084 (revision of RP-193226); Title: Revised WID: Integrated Access and Backhaul for NR; Agenda Item: 9.3.11; Source: Qualcomm; Document for: Approval; Date and Location: Mar. 16-19, 2020, Electronic Meeting, consisting of 7-pages.
3GPP TSG RAN WG1 #102-e R1-2006166; Title: Other enhancements to Timing, Power Control and CLI for NR IAB; Agenda Item: 8.10.2; Source: Samsung; Document for: Discussion and Decision; Date and Location: Aug. 17-28, 2020, e-Meeting, consisting of 4-pages.
3GPP TSG-RAN WG1 Meeting #102-e R1-2006904; Title: Other enhancements for simultaneous child and parent link operation in IAB; Agenda Item: 8.10.2; Source: Ericsson; Document for: Discussion, Decision; Date and Location: Aug. 17-28, 2020, e-Meeting, consisting of 11-pages.
3GPP TSG RAN WG1 #103-e R1-2008995; Title: Enhancements to Resource Multiplexing between Child and Parent Links of an IAB Node; Agenda Item: 8.10.1; Source: Intel Corporation; Document for: Discussion and decision; Date and Location: Oct. 26-Nov. 13, 2020, e-Meeting, consisting of 11-pages.
3GPP TR 38.874 V16.0.0; 3rd Generation Partnership Project; Technical Specification Group Radio Access Network; NR; Study on Integrated Access and Backhaul; (Release 16); Dec. 2018, consisting of 111-pages.
3GPP TS 38.213 V16.6.0; 3rd Generation Partnership Project; Technical Specification Group Radio Access Network; NR; Physical layer procedures for control (Release 16); Jun. 2021, consisting of 187-pages.
3GPP TS 38.321 V16.5.0; 3rd Generation Partnership Project; Technical Specification Group Radio Access Network; NR; Medium Access Control (MAC) protocol specification (Release 16); Jun. 2021, consisting of 157-pages.
3GPP TS 38.211 V16.2.0; 3rd Generation Partnership Project; Technical Specification Group Radio Access Network; NR; Physical channels and modulation (Release 16); Jun. 2020, consisting of 131-pages.
3GPP TSG RAN WG1 Meeting #102-e; RAN1 Chairman's Notes, Aug. 17-28, 2020, e-Meeting, consisting of 204-pages.

* cited by examiner ns
IAB CASE-6 TIMING AND ADJUSTMENT

CROSS-REFERENCE TO RELATED APPLICATIONS

This application is a Submission Under 35 U.S.C. § 371 for U.S. National Stage Patent Application of International Application No.: PCT/EP2022/050917, filed Jan. 17, 2022 entitled "IAB CASE-6 TIMING AND ADJUSTMENT," which claims priority to Chinese Application No.: PCT/CN2021/072487, filed Jan. 18, 2021, the entireties of both of which are incorporated herein by reference.

TECHNICAL FIELD

The present disclosure relates to wireless communications, and in particular, to Integrated Access and Backhaul (IAB) communication timing and adjustment such as with respect to 3GPP timing alignment Case-6.

BACKGROUND

Integrated Access and Backhaul (IAB) and IAB Enhancement

In Third Generation Partnership Project (3GPP) Release 17 (Rel-17), there is a Work Item (WI) on enhancement to Integrated Access and Backhaul (IAB) [RP-193251] based on 3GPP Rel-16 IAB Work Item Description (WID) [RP-200084], and the earlier Study Item described in 3GPP Technical Report (TR) 38.874. One purpose of IAB is to replace existing wired backhaul or a wireless backhaul with flexible wireless backhaul using the existing 3GPP bands providing not only backhaul but also existing cellular services by the same node.

Each IAB node includes a Distributed Unit (DU) function and a Mobile Termination (MT). The IAB node connects, via the MT, to an upstream IAB node, which could also be a donor node as described in, for example, 3GPP TR 38.874. The IAB node establishes, via the DU, Radio Link Control (RLC) channels to MTs of downstream IAB nodes and/or provides access links to wireless devices. FIG. 1 is a diagram of examples of possible connections for an IAB node, including access link to wireless devices and backhaul links to both an upstream parent IAB node and a downstream child IAB node.

An IAB-node may perform two types of transmissions:
- IAB-MT uplink (UL) transmissions towards the parent IAB node (also referred to as parent IAB), and
- IAB-DU downlink (DL) transmissions towards wireless devices and child IAB nodes (also referred to as child IAB).

An IAB-node may also perform two types of receptions:
- IAB-MT DL receptions from the parent IAB-DU transmission, and
- IAB-DU UL receptions from wireless devices and child IAB-MT transmission.

Typically, IAB-MT transmission or reception is determined by the parent IAB-DU, while IAB-DU transmission or reception to and from a wireless device or child IAB node are under control of the IAB node. The IAB-MT may act as a wireless device towards its parent IAB-DU and much of its behavior is inherited from typical wireless device behavior. As such, the parent IAB-DU controls an IAB-MT in terms of transmit power, timing and scheduling both for its UL and DL. The IAB node has the corresponding control over its child IAB nodes and wireless device that are connected to it.

Different cases of transmission timing alignment across IAB nodes and IAB donors have been considered. For example, 3GPP TR 38.874 lists, among others, the following cases:

Case #1: DL transmission timing alignment across IAB nodes and IAB donors:
  If DL TX and UL RX are not well aligned (i.e., misaligned by at least a predefined quantity) at the parent IAB node, additional information about the alignment is needed for the child IAB node to properly set its DL TX timing for OTA based timing & synchronization.

Case #2: DL and UL transmission timing is aligned within an IAB node;

Case #3: DL and UL reception timing is aligned within an IAB node;

Case #6 (Case #1 DL transmission timing+Case #2 UL transmission timing) also referred to as Case-6:
  The DL transmission timing for all IAB nodes is aligned with the parent IAB node or donor DL timing; and
  The UL transmission timing of an IAB node can be aligned with the IAB node's DL transmission timing.

Case #7 (Case #1 DL transmission timing+Case #3 UL reception timing):
  The DL transmission timing for all IAB nodes is aligned with the parent IAB node or donor DL timing;
  The UL reception timing of an IAB node can be aligned with the IAB node's DL reception timing; and
  If DL TX and UL RX are not well aligned at the parent IAB node, additional information about the alignment is needed for the child IAB node to properly set its DL TX timing for OTA based timing & synchronization.

3GPP TR 38.874 describes that the use of Case #6 (referred to herein as Case-6), if supported, at the IAB node, may be under control of the parent IAB node or network.

A question that remains is what timing an IAB node should use for the transmission and reception of the different links.

It may be assumed that the transmission timing of IAB-MT UL transmissions is controlled by an IAB-DU in the same way as a network node (i.e., base station) controls the transmission timing of UL transmissions from wireless device, i.e., by means of explicit timing control commands. This control is such that the UL transmission is received at the network node with an appropriate timing. What the appropriate timing is may be an IAB-DU internal decision.

Further, in 3GPP Rel-16, IAB-nodes may support timing Case-1. This is achieved by the parent IAB node providing information about its timing relation of its DL transmissions and UL receptions (also known as T_delta as described in, for example, 3GPP 38.213. Though not explicitly mentioned in the definition of Case-1 timing alignment, the transmission timing of UL transmissions from an IAB-MT is controlled by its parent IAB-DU in the same way as the parent IAB-DU controls the transmission timing of UL transmissions from wireless devices. FIG. 2 depicts an example of the transmission and reception timing relations of some IAB nodes operating in Case-1 transmission timing alignment where, for simplification, no UL-to-DL switching gap is assumed.

In 3GPP RAN1 #102-e, i.e., [3GPP TSG RAN WG1 Meeting #102-e, "Chairman's Notes RAN1 #102-e final", e-Meeting, Aug. 17-28, 2020], it was described that:

Case-6 timing is supported in 3GPP Rel-17 for IAB-nodes operating in multiplexing scenario Case A (simultaneous MT-Tx/DU-Tx).

RAN1 should strive to minimize specification impact due to this feature.

FIG. 3 depicts an example of the transmission and reception timing relations of some IAB nodes operating in Case-6 transmission timing alignment where, for simplification, no UL-to-DL switching gap is assumed.

For Case-6 timing, and disregarding the impact and changes on the transmission timing of UL transmissions from wireless devices, an IAB-MT should not necessarily set its transmission timing according to explicit timing control commands from its parent IAB-DU relative to its received DL timing from parent IAB-DU but to be aligned to its collocated IAB-DU DL transmission timing. The configuration of Case-6 at the IAB-node is under control of the parent IAB-node or some other network node.

Random Access in New Radio (NR, Also Referred to as 5$^{th}$ Generation (5G)) Communications Two types of random access procedure are typically supported: 4-step RA type with MSG1 and 2-step RA type with MSGA. Both types of RA procedure support contention-based random access (CBRA) and contention-free random access (CFRA).

The wireless device selects the type of random access at initiation of the random access procedure based on network configuration:

when CFRA resources are not configured, an reference signal received power (RSRP) threshold is used by the wireless device to select between 2-step RA type and 4-step RA type;

when CFRA resources for 4-step RA type are configured, the wireless device performs random access with 4-step RA type;

when CFRA resources for 2-step RA type are configured, the wireless device performs random access with 2-step RA type.

The network node does not configure CFRA resources for 4-step and 2-step RA types at the same time for a Bandwidth Part (BWP). CFRA with 2-step RA type may only be supported for handover.

NR 4-Step Random Access Procedure

The 4-step random access procedure is illustrated in FIG. 4. For initial access, a wireless device initiates the random-access procedure by transmitting in UL a random-access preamble (Msg 1 or (1)) on a physical random-access channel (PRACH). After detecting the Msg1, the network node (e.g., gNB) responds by transmitting in DL a random-access response (RAR) on a PDSCH (Msg2). In the third step, after successfully decoding Msg2, the wireless device continues the procedure by transmitting in UL a PUSCH (Msg3) for terminal identification and RRC connection establishment request. In the last step of the procedure, the network node transmits in DL a PDSCH (Msg4) for contention resolution.

NR 2-Step Random Access Procedure

The 2-step random access procedure, also referred to as Type-2 random access procedure in TS 38.213, is illustrated in FIG. 5. In the first step, a wireless device sends a message A including random access preamble together with higher layer data such as Radio Resource Control (RRC) connection request possibly with some small payload on PUSCH.

After detecting the MsgA, the network node sends RAR (called MsgB) including wireless device identifier assignment, timing advance information, and contention resolution message, etc.

The RAR for MsgB is carried by a Physical Downlink Shared Channel (PDSCH) scheduled by Physical Downlink Control Channel (PDCCH) with Cyclic Redundancy Check (CRC) scrambled by MsgB-RNTI derived by adding a fixed offset to the RA-RNTI calculated based on the time and frequency resource of the PRACH occasion used for the transmission of the MsgA preamble part. The wireless device monitors the MsgB in a RAR window with maximum length of 40 ms after the transmission of MsgA.

Contention Free Random Access Procedure

For CFRA with 4-step RA type, dedicated preamble for MSG1 transmission is assigned by the network node or network and upon receiving random access response from the network node, the wireless device ends the random access procedure as shown in FIG. 6a.

For CFRA with 2-step RA type, dedicated preamble and PUSCH resources are configured for MSGA transmission and upon receiving the network node response, the wireless device ends the random access procedure as shown in FIG. 6b.

Referring back to FIG. 3, the UL reception timing of an IAB-DU is not necessarily set by some internal preferences but determined by the propagation delay between the IAB node and its child IAB node (assuming the child IAB node is operating in Case-6 timing configuration). In real world operation, there will be Time Alignment Error (TAE) between the parent IAB node and IAB node and also TAE among the child IAB nodes. FIG. 7 is a diagram of a transmission and reception timing relations of IAB nodes operating in Case-6 transmission timing alignment considering the TAE, i.e., TAE may need to be taken into account when parent IAB-DU sets the Case-6 timing for IAB-MT.

The IAB-MT may operate in legacy timing during the initial access phase and after that, the Case-6 timing could be enabled to allow for a simultaneously transmission feature where the IAB-MT simultaneously transmits in UL when IAB-DU is transmitting in DL to child IAB nodes and/or wireless devices. During the transition from Case-1 to Case-6 timing, the parent IAB-DU may need to adjust its reception time window for the reception of IAB-MT transmissions. At the same time, IAB-MT may need to adjust its uplink transmission timing by either following instruction from the parent IAB node or by internal settings, in order to eventually align its transmission timing with its co-located IAB-DU downlink transmission timing.

Before Enabling the Case-6 Timing

When parent IAB-DU is configured with Case-6 timing, its frame timing at the receiver may need to be adjusted. In legacy receive timing, as shown in FIG. 8, the uplink timing is derived based on the same frame timing as DL and all receptions of wireless device signals are timing aligned by control through timing advance mechanisms. If IAB-MT would be using the legacy timing, the IAB-MT signal may be received within the cyclic prefix of legacy timing window. In most of the cases where IAB nodes are deployed far away from its parent IAB node, the received signal from an IAB-MT operating with Case-6 timing may not arrive properly within parent IAB-DU receiving window and thus IAB-DU receiver frame sync timing may need to be adjusted. This indicates that, in the digital processing for the received signal from Case-6 timing, the additional adjustment time from IAB-DU may be needed to reconfigure the radio processing and thus a significant transition time would be introduced for the transition period from legacy timing to Case-6 timing at parent IAB node.

Problem-1: Transition from Legacy to Case-6 Timing May Incur Hardware Tuning Time.

After the parent IAB node reconfigures its uplink timing, the original timing relation with the IAB-MT may be lost. Thus, there may be a need to re-establish the parent IAB-DU's timing for receiving IAB-MT transmissions.

Problem-2: The Reception of an IAB-MT Signal at Parent IAB Node May be Impossible after a New Reception Frame Timing is Established at Parent IAB Node and Transmitter and Receiver are not Sufficiently Synchronized Anymore. After Enabling the Case-6 Timing To enable the Case-6 timing, parent IAB-DU may need to successfully receive the IAB-MT signal. Because, if the IAB-MT adjusts its uplink transmission timing aligned to the co-located IAB-DU transmission timing, from parent IAB-DU perspective, this is a shift by the propagation delay plus a TAE. There is a risk that the parent IAB-DU may miss the reception of the IAB-MT signal, if the signal from the IAB-MT falls outside of the FFT receive window caused by several factors below:

- The Cyclix prefix is short and thereby the flexibility for a valid reception window from IAB-MT is small; e.g., assuming 120 kHz SCS, the CP length is about 0.57 us.
- There are estimation errors for propagation delay and the timing alignment difference between parent IAB-DU and IAB-DU (TAE), which further reduces the valid reception window at parent IAB-DU side.
- IAB-MT transmission timing error (Te)
- Different clock speeds and drift between the IAB node and parent IAB node. The TAE may change depending how fast the IAB-MT transitions/switched from Case-1 to Case-6 timing configuration.

One case is a time-out of the timeAlignmentTimer. This is specified in, for example, clause 5.2 in 3GPP TS 38.321. The IAB-MT starts this timer after receiving the first Timing Advance (TA) Command in MAC RAR. If the IAB-MT has not received a TA Command by the expiry of the timeAlignmentTimer, IAB-MT may assume it has lost the uplink synchronization, and IAB-MT may perform the following:
1> when a timeAlignmentTimer expires:
  2> if the timeAlignmentTimer is associated with the PTAG (e.g., primary timing advance group):
    3> flush all HARQ (hybrid automatic repeat request) buffers for all Serving Cells;
    3> notify RRC to release PUCCH for all Serving Cells, if configured;
    3> notify RRC to release SRS for all Serving Cells, if configured;
    3> clear any configured downlink assignments and configured uplink grants;
    3> clear any PUSCH resource for semi-persistent CSI reporting;
    3> consider all running timeAlignmentTimers as expired;

Similar steps can be taken if the timeAlignmentTimer is associated with any STAG as described, for example, in 3GPP TS 38.321.

If the IAB-MT signal arriving at the parent IAB-DU is outside or at least not properly within the parent IAB-DU receiving window, the parent IAB-DU may not successfully decode the IAB-MT signal and thus the IAB-MT may have the timeAlignmentTimer expired situation and may start the UL sync process which takes long time to recover from the Case-6 timing failure, especially when there is transition time needed for parent IAB node switching between legacy timing and Case-6 timing.

Hence, certain situations associated with Case-6 timing lack robustness.

SUMMARY

Some embodiments advantageously provide methods, systems, and apparatuses for IAB communication timing and adjustment such as with respect to Case-6.

The one or more methods for initial case-1 timing to case-6 timing transition and one or more methods for timing adjustment for case-6 timing operation are described herein. One or more embodiments described herein advantageously addresses the methods to adjust Case-6 timing for synchronization, and helps to prevent the failure of the IAB-MT uplink synchronization/timing, as well as helps to provide for fast recovery of a potential loss of IAB-MT timing for transmission. The methods also make it possible to dynamically adjust the timing based on different conditions, and thus the network flexibility is improved.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
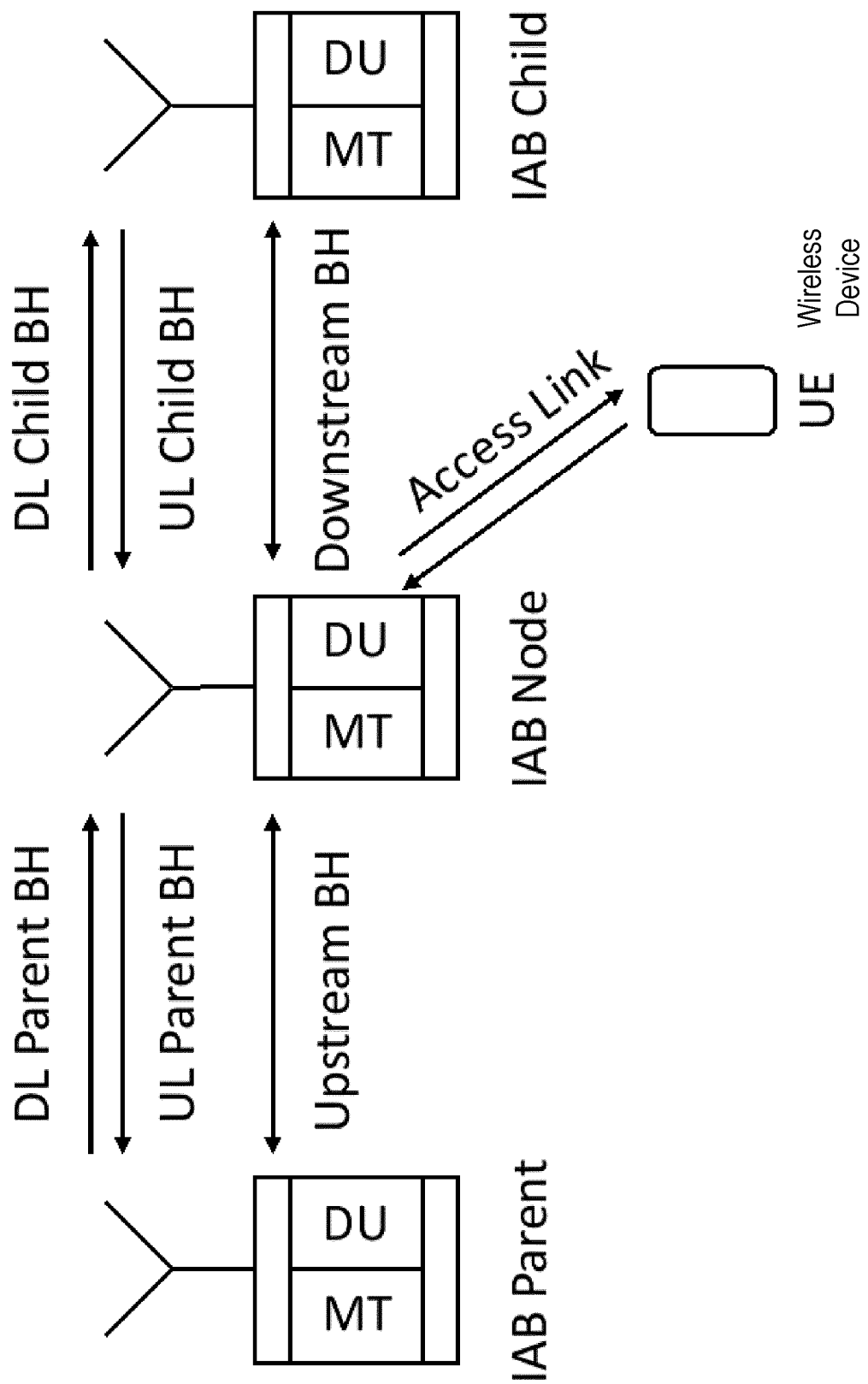
FIG. 1 is a diagram of an example of IAB-MT and IAB-DU for backhaul and access link.
Figure 2:
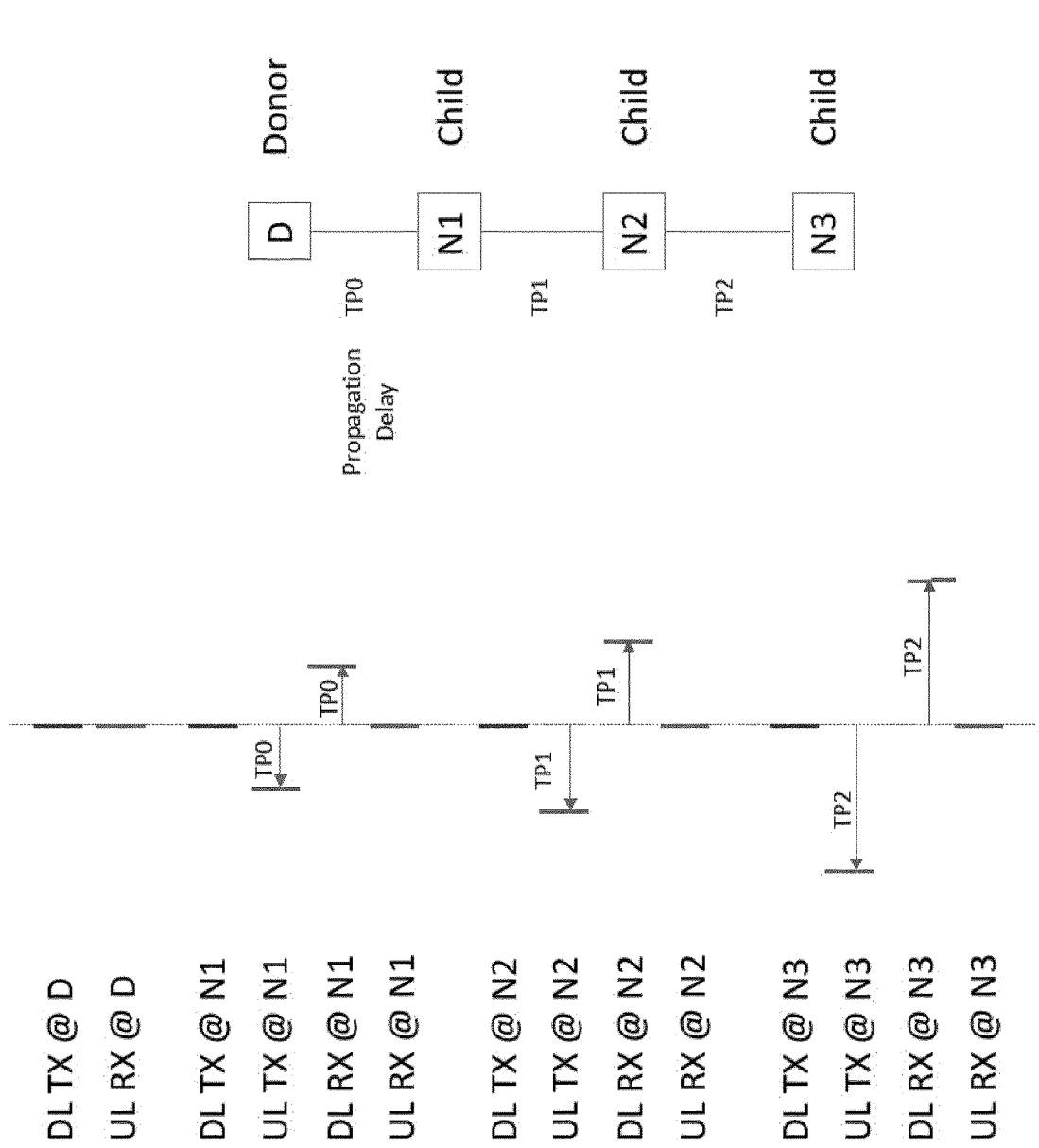
FIG. 2 is a diagram of an example transmission and reception timing relations of IAB nodes operating in Case-1 transmission timing alignment.
Figure 3:
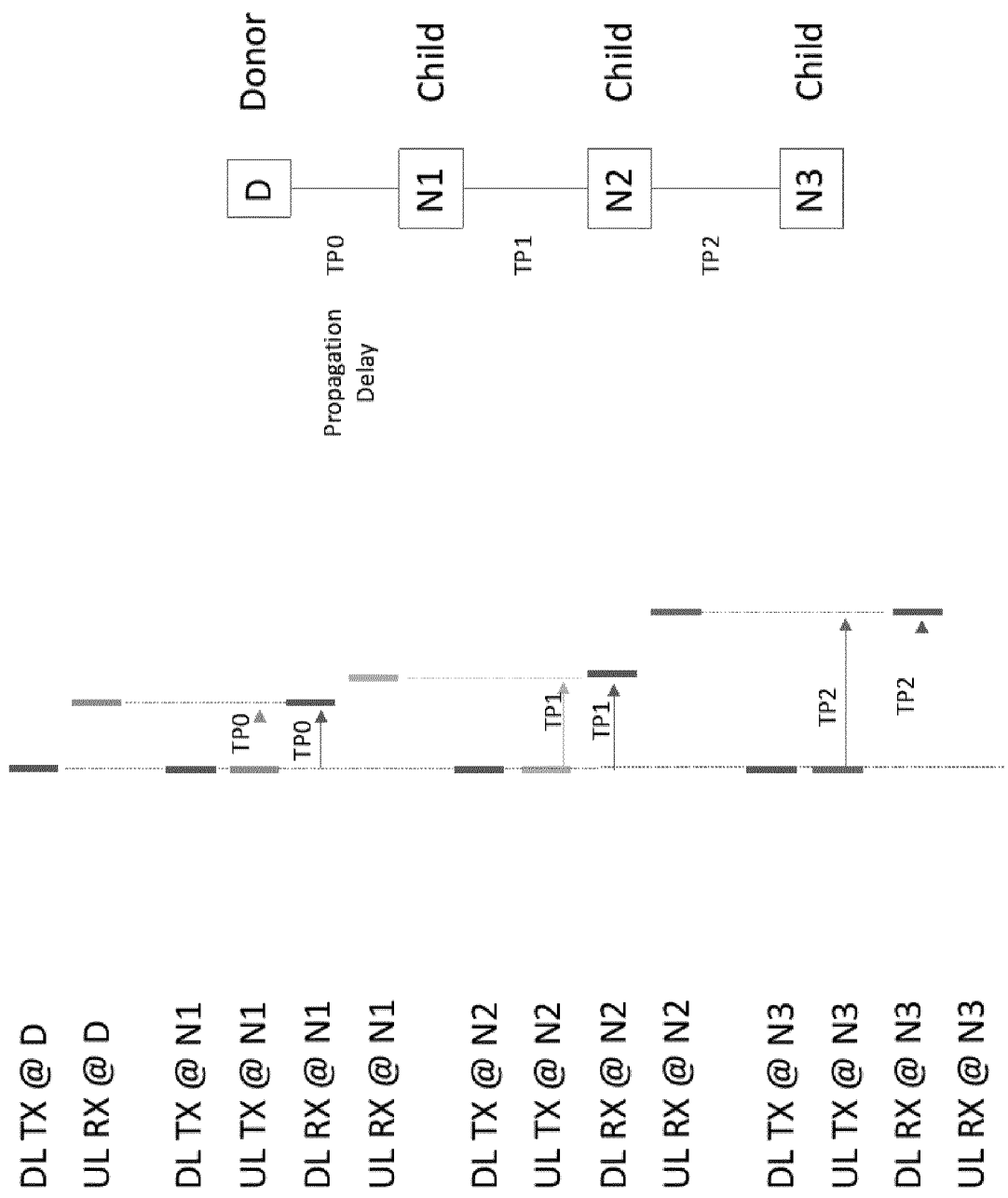
FIG. 3 is a diagram of an example transmission and reception timing relations of IAB nodes operating in Case-6 transmission timing alignment.
Figure 4:
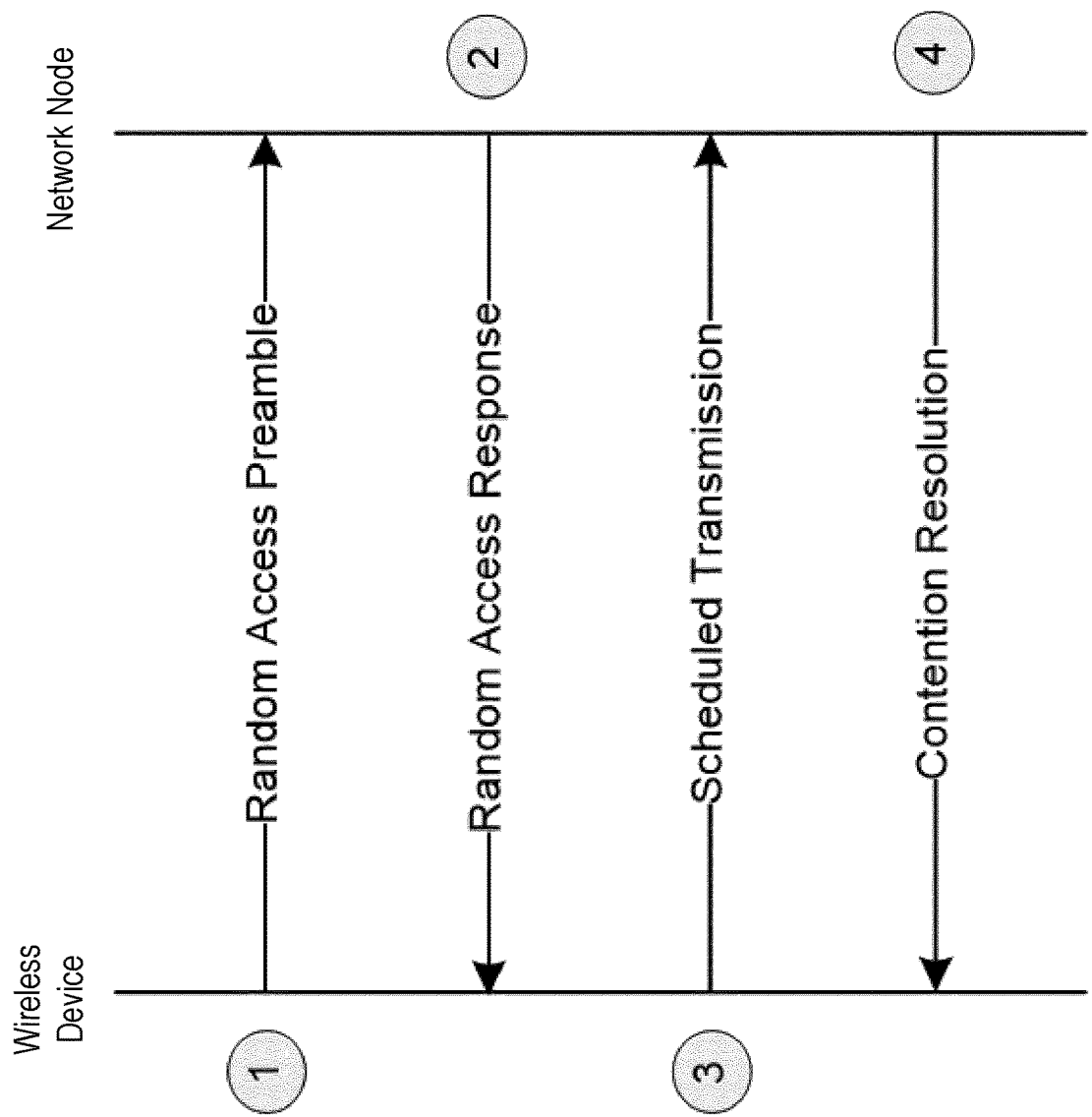
FIG. 4 is a diagram of an example of a 4-step random access procedure.
Figure 5:
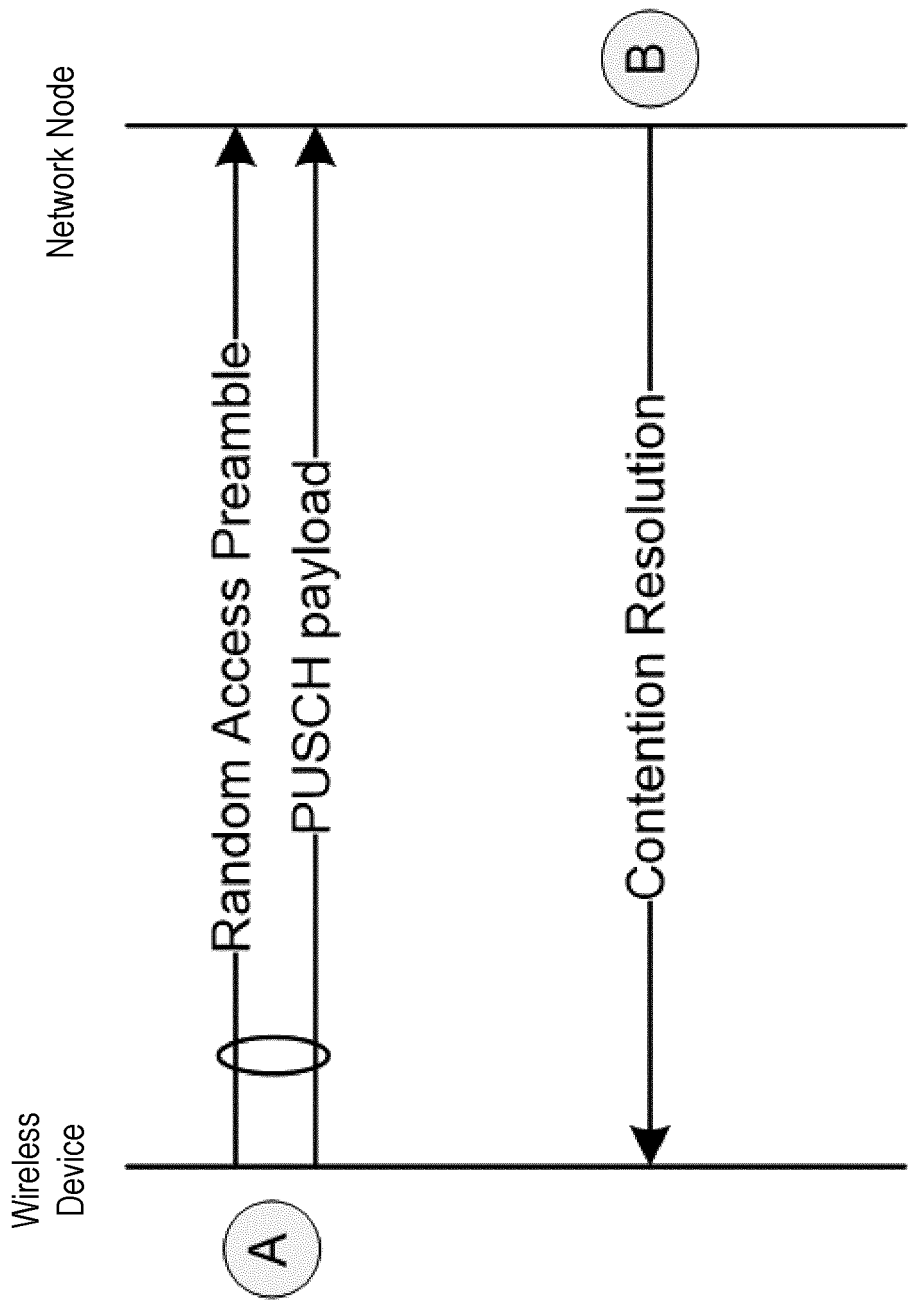
FIG. 5 is a diagram of an example of a 2-step random access procedure for initial access.
Figure 6B:
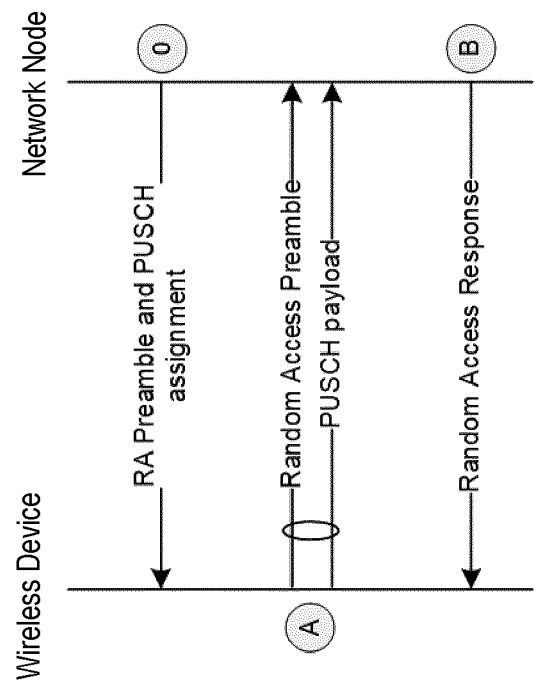
FIG. 6b is a diagram of an example of a contention free random access procedure with 2-step RA type.
Figure 6A:
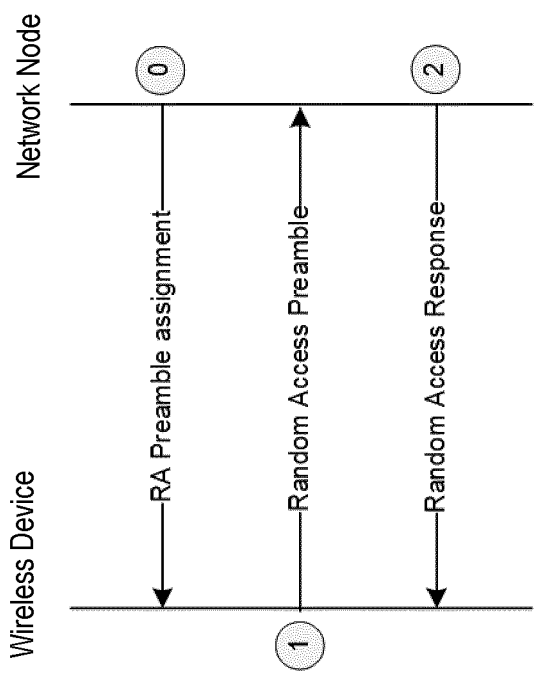
FIG. 6a is a diagram of an example of a contention free random access procedure with 4-step RA type.
Figure 7:
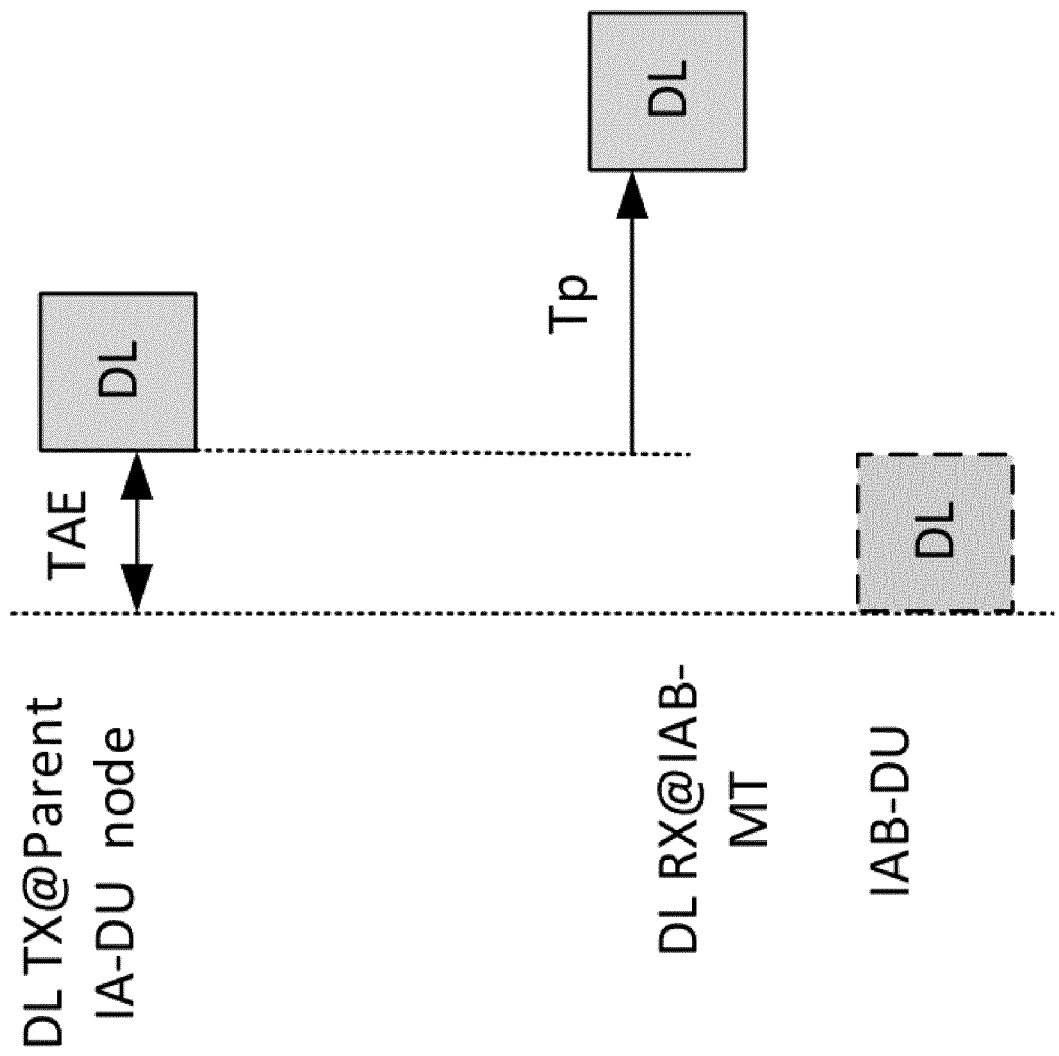
FIG. 7 is a diagram of example transmission and reception timing relations of IAB nodes operating in Case-6 transmission timing alignment considering the TAE.
Figure 8:
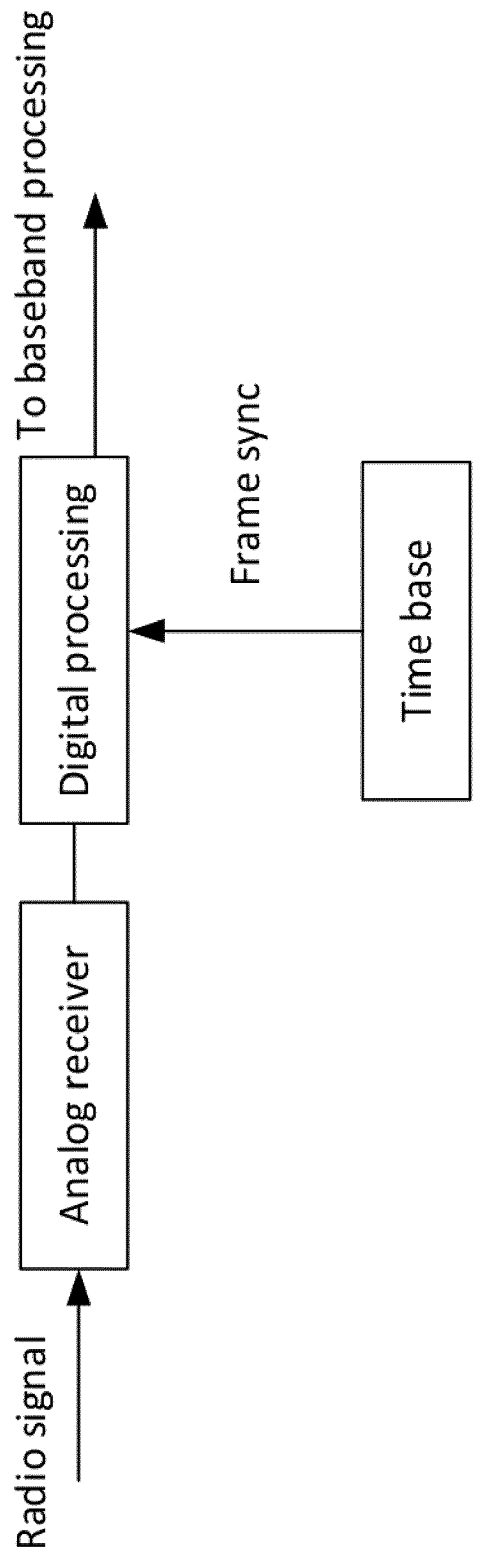
FIG. 8 is an example of a frame sync for the uplink timing in radio signal processing.

Before describing in detail exemplary embodiments, it is noted that the embodiments reside primarily in combinations of apparatus components and processing steps related to IAB communication timing and adjustment such as with respect to Case-6. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), integrated access backhaul (IAB) node such as a parent IAB node and/or child IAB node, Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU), Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU), Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide IAB timing and adjustment such as with respect to Case-6, as described herein.

Figure 9:
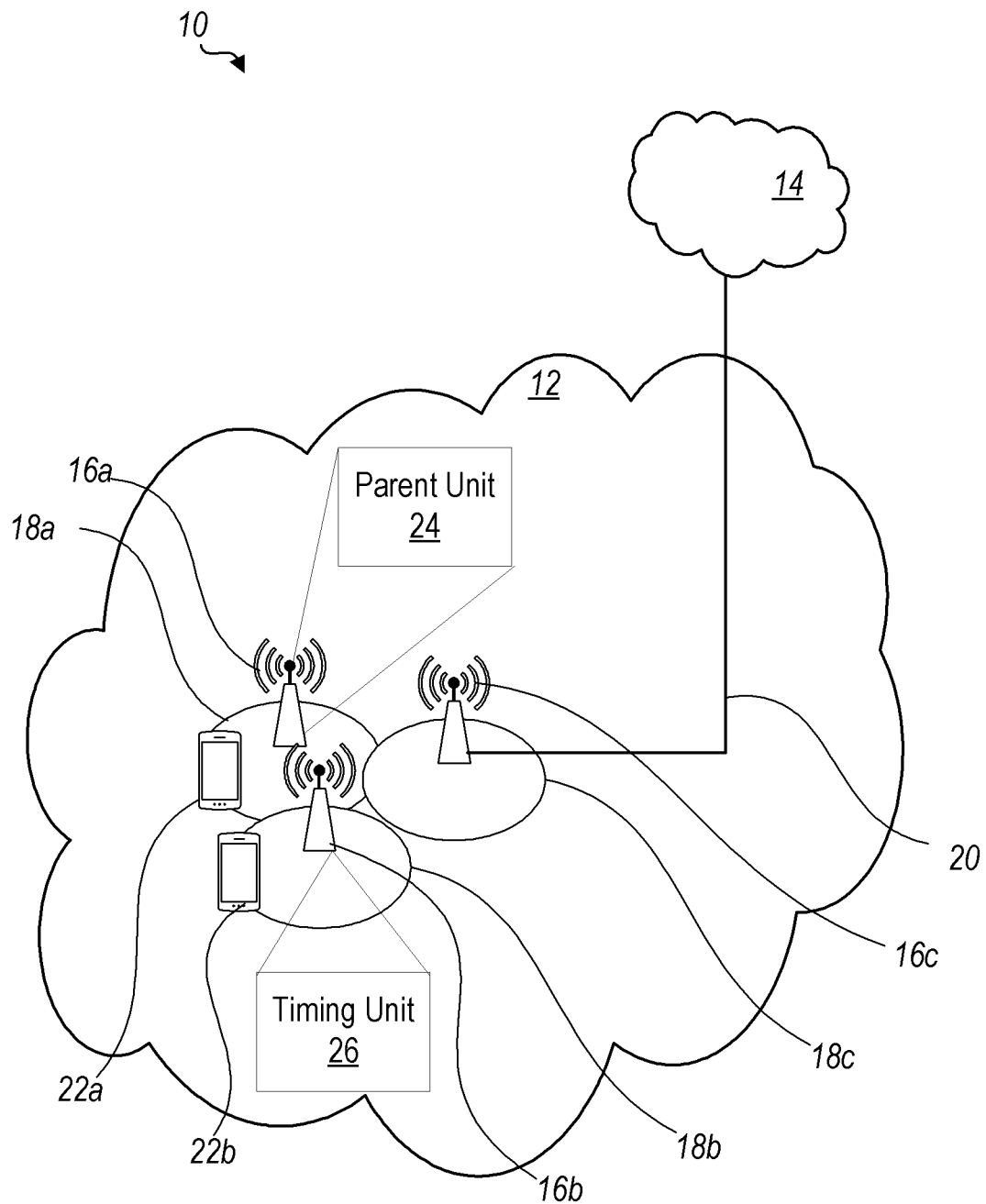
FIG. 9 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 9 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs, IABs or other types of wireless access points where, for example, network node 16a is a parent network node such as a parent IAB node 16 and network node 16*b* is a child network node such as a child IAB node 16. Each network node 16 defines a corresponding coverage area 18*a*, 18*b*, 18*c* (referred to collectively as coverage areas 18). Each network node 16*a*, 16*b*, 16*c* may be connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16*a*, when it configures with IAB functions, it can act both as a parent IAB node, i.e., providing service to a child IAB node, and a child IAB node, i.e., receiving service from a parent IAB node. Each IAB node, regardless being parent or child, has a DU timing unit and a MT timing unit.

A network node 16*a*, when it functions as a parent node, e.g., using a logic parent unit 24 which is configured to perform one or more network node 16 functions as described herein such as with respect to Case #6 IAB timing and adjustments. In one or more examples, network node 16*a* is a parent network node 16 and/or parent IAB node 16. However, the present disclosure is not limited thereto. In some other examples, network node 16*a* may be a child network node 16 and/or child IAB node 16, for example, when there is another IAB node acting as a parent node for the network node 16*a*. Therefore, either child IAB timing and adjustment, or parent IAB timing and adjustment, or both may be performed by network node 16*a*.

A network node 16*b* is configured to include timing unit 26 which is configured to perform one or more network node functions as described herein such as with respect to Case #6 IAB timing and adjustments. In one or more examples, network node 16*b* is a child network node 16 and/or child IAB node 16 (also referred to as an IAB node 16). However, the present disclosure is not limited thereto. In some other examples, network node 16*b* may be a parent network node 16 and/or parent IAB node 16, for example, when there is another IAB node acting as a child node for the network node 16*b*. Therefore, either child IAB timing and adjustment, or parent IAB timing and adjustment, or both may be performed by network node 16*b*.

Example implementations, in accordance with an embodiment, of the WD 22 and network node 16 discussed in the preceding paragraphs will now be described with reference to FIG. 10. In a communication system 10, parent network node 16*a* includes hardware 28 enabling it to communicate with other network nodes 16 and with the WD(s) 22. The hardware 28 may include a communication interface 30 for setting up and maintaining a wired or wireless connection with an interface of a different communication device of the communication system 10, as well as a radio interface 32 for setting up and maintaining at least a wireless connection with a WD 22 located in a coverage area 18 served by the parent network node 16*a* and/or with another network node 16. The radio interface 32 may be formed as or may include, for example, one or more RF transmitters, one or more RF receivers, and/or one or more RF transceivers. The communication interface 30 may be configured to facilitate a connection to, for example, other network nodes 16.

In the embodiment shown, the hardware 28 of the parent network node 16*a* further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the parent network node 16*a* further has software 40 stored internally in, for example, memory 38, or stored in external memory (e.g., database, storage array, network storage device, etc.) accessible by the parent network node 16*a* via an external connection. The software 40 may be executable by the processing circuitry 34. The processing circuitry 34 may be configured to control any of the methods and/or processes described herein and/or to cause such methods, and/or processes to be performed, e.g., by parent network node 16*a*. Processor 36 corresponds to one or more processors 36 for performing parent network node 16*a* functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to parent network node 16*a*. For example, processing circuitry 34 of the parent network node 16*a* may include parent unit 24 configured to perform one or more parent network node 16*a* functions related to IAB timing and adjustment as described herein. Further, in one or more embodiments, processing circuitry 34 includes distributed unit (DU) 23 and mobile termination (MT) 25, the functions of both of which are described herein.

Communication system 10 further includes network node 16*b* such as a child network node 16*b* or child IAB node 16*b*. Network node 16*b* may include the same hardware 28 and software 40 as described above with respect to parent network node 16*a* except as modified to perform network node 16*b* functionality. For example, processing circuitry 34 of network node 16*b* may include timing unit 26 configured to perform one or more network node 16 functions related to IAB timing and adjustment as described herein. It is also understood that a network node 16*a* may be configured to also operate as network node 16*b* and vice versa. Thus, the separation of functionality and description herein regarding network nodes 16*a* and 16*b* is for ease of understanding and is not intended to be limiting.

Figure 10:
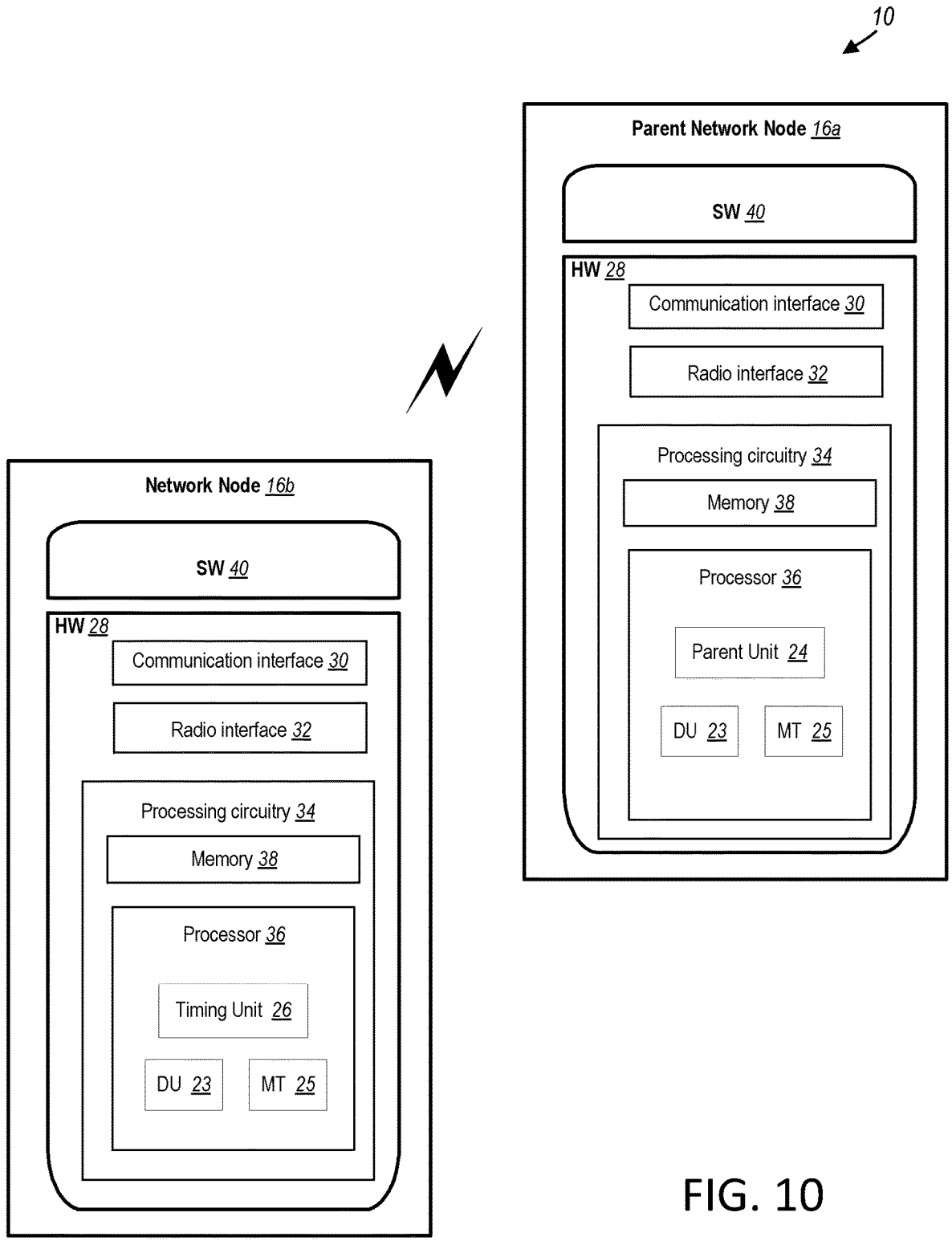
FIG. 10 is a block diagram of a host computer communicating via a network node with a wireless device over an at least partially wireless connection according to some embodiments of the present disclosure.

In some embodiments, the inner workings of the network nodes 16 may be as shown in FIG. 10 and independently, the surrounding network topology may be that of FIG. 9.

Although FIGS. 9 and 10 show various "units" such as parent unit 24 and timing unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 11:
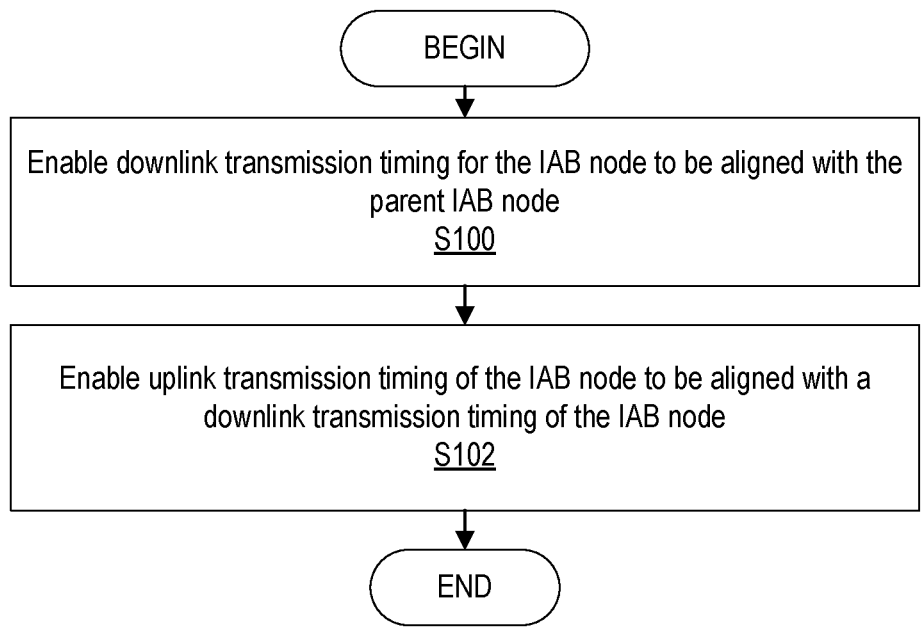
FIG. 11 is a flowchart of an exemplary process in a network node according to some embodiments of the present disclosure.

FIG. 11 is a flowchart of an exemplary process in a parent network node 16a according to some embodiments of the present disclosure. One or more Blocks and/or functions performed by parent network node 16a may be performed by one or more elements of parent network node 16a such as by parent unit 24 in processing circuitry 34, processor 36, radio interface 32, etc. In one or more embodiments, parent network node 16a such as via one or more of processing circuitry 34, processor 36, parent unit 24, communication interface 30 and radio interface 32 is configured to enable (Block S100) downlink transmission timing for the network node 16b to be aligned with the parent network node 16a, as described herein. In one or more embodiments, parent network node 16a such as via one or more of processing circuitry 34, processor 36, parent unit 24, communication interface 30 and radio interface 32 is configured to enable (Block S102) uplink transmission timing of the network node 16b to be aligned with a downlink transmission timing of the network node 16b, as described herein.

According to one or more embodiments, the processing circuitry 34 is further configured to, before enabling the case-6 timing: determine whether to switch to a different frame timing, and initiate a random access channel process to be performed to capture signaling from the network node 16b before the enabling of the case-6 timing. According to one or more embodiments, the enabling of the case-6 timing corresponds to a switch from Case-1 timing to Case-6 timing.

According to one or more embodiments, the processing circuitry 34 is further configured to, after enabling case-6 timing, adjust the case-6 timing. According to one or more embodiments, the adjustment of the case-6 timing is based on at least one of: an estimated timing difference based on downlink SSB, an estimated timing based on downlink reference signals, an estimated timing based on uplink reference signals, and a reported Global Navigation Satellite System, GNSS, position for calculation of delay between the parent network node 16a and the network node 16b.

Figure 12:
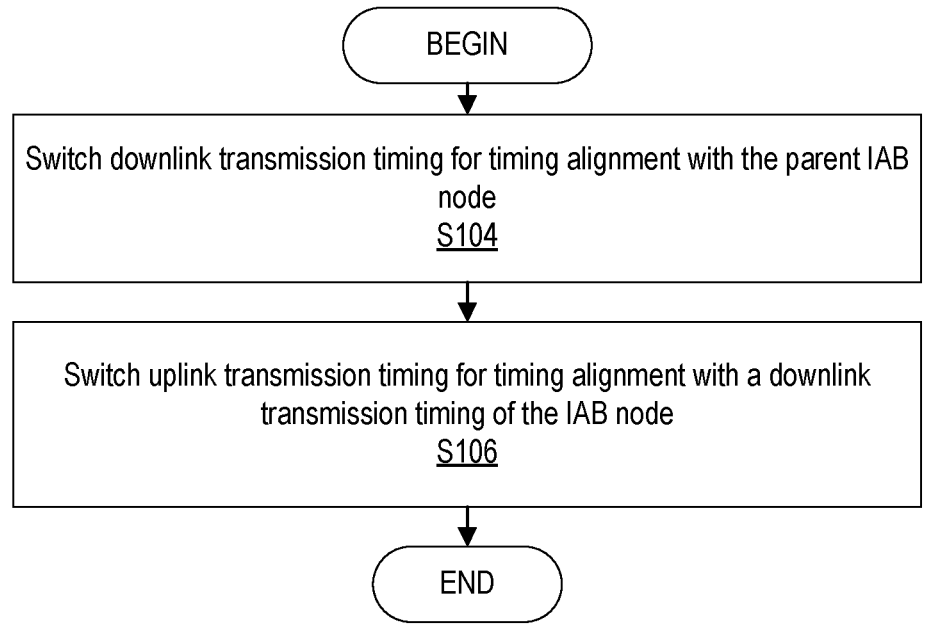
FIG. 12 is a flowchart of an exemplary process in a network node according to some embodiments of the present disclosure.

FIG. 12 is a flowchart of an example process in a network node 16b according to some embodiments of the present disclosure. One or more Blocks and/or functions performed by network node 16b may be performed by one or more elements of network node 16b such as by timing unit 26 in processing circuitry 34, processor 36, radio interface 32, etc. In one or more embodiments, network node 16b such as via one or more of processing circuitry 34, processor 36, timing unit 26, communication interface 30 and radio interface 32 is configured to switch (Block S104) downlink transmission timing for timing alignment with the parent network node 16a, as described herein. In one or more embodiments, network node 16b such as via one or more of processing circuitry 34, processor 36, timing unit 26, communication interface 30 and radio interface 32 is configured to switch (Block S106) uplink transmission timing for timing alignment with a downlink transmission timing of the network node 16b, as described herein.

According to one or more embodiments, the processing circuitry 34 is further configured to, before switching the downlink transmission timing and uplink transmission timing: receive an indication to perform random access channel process, and cause signaling based at least on performing the random-access channel process, the signaling configured to be captured by the parent network node 16a before the switching of the case-6 timing. According to one or more embodiments, the switching the case-6 timing corresponds to a switch from Case-1 timing to Case-6 timing.

According to one or more embodiments, the processing circuitry 34 is further configured to, after the switching of the case-6 timing, adjust the downlink transmission timing and uplink transmission timing. According to one or more embodiments, the adjustment of the case-6 timing is based on at least one of: an estimated timing difference based on downlink SSB, an estimated timing based on downlink reference signals, an estimated timing based on uplink reference signals, and a reported Global Navigation Satellite System, GNSS, position for calculation of delay between the parent network node and the network node.

Having generally described arrangements for IAB communication timing and adjustment such as with respect to Case-6 timing, details for these arrangements, functions and processes are provided as follows, and which may be implemented by network node 16a (i.e., parent IAB node 16a) and/or network node 16b (i.e., child IAB node 16b, IAB node 16b).

Some embodiments provide for IAB communication timing and adjustment such as with respect to Case-6 timing.

One or more methods described herein provide for how to adjust the Case-6 timing for the transmissions from IAB-MT in one IAB node to IAB-DU in a parent IAB node 16a.

Initial Timing Transition from Case-1 to Case-6

Before enabling the IAB-MT Case-6 timing, a parent IAB node 16a such as via one or more of processing circuitry 34, processor 36, radio interface 32, parent unit 24, etc., may need to determine whether and when to switch to Case-6 timing. IAB-MT propagation delay and TAE information may need to be considered, by the parent IAB node 16a, in order to set its frame timing. Parent IAB-DU such as via one or more of processing circuitry 34, processor 36, radio interface 32, parent unit 24, etc., may initiate, e.g., PDCCH ordered RACH process for Case-6 IAB-MT to capture the IAB-MT signal from IAB node 16b before enabling the Case-6 timing on IAB-MT.

First of all, some conditions may need to be defined for switching to Case-6 timing when the IAB-MT is in operation with Case-1 timing, so that the Case-6 timing can be expected to be stable enough on the IAB nodes 16 in normal operation.

In one embodiment, the Case-1 to Case-6 timing switching is triggered when one or more of the following example requirements are met:

The TA variation is no larger than a predetermined threshold
    The threshold can be a predetermined value depending on one or more of the following:
        CP length, e.g., a normal CP, extended CP, etc.
        Subcarrier spacing
        TA variation/statistics
        TA update frequency
    The threshold can be RRC configured The Guard symbol, as described in, for example, 3GPP TS 38.321, section 5.18.19, configuration for IAB in each slot, e.g., the guard symbols signaled in Provided Guard Symbols MAC CE The propagation delay between parent IAB node 16*a* and child IAB node 16*b* is not or has not changed so that changes of Case-1 and Case-6 transmission timing allow for one or more of the following:
  Timing changes are within a limit
    The limit can be indicated by a configurable threshold
  Changes of TA are within a limit
    The limit can be indicated by a configurable threshold
  Changes of guard symbol configuration such as, for example, 3GPP TS 38.321, section 5.18.19, may be needed or are at least within a limit
    The limit can be indicated by a configurable threshold for all guard symbol types or per guard symbol type.
Signal level or signal quality measured during the reception of the signals from MT to DU is above a threshold value.
  E.g., an RSRP or RSRQ threshold can be defined to determine whether a Case-6 timing can be applied for later transmissions from MT to DU.
Backhaul traffic situation and requirements such as
  Burstiness
  Traffic types and statistics, such as average traffic, over different time periods, such as certain individual hours, times of days or certain days In one or more embodiments, the initial transition from Case-1 timing to Case-6 timing is based on one or more of:
  PDCCH ordered RA, or higher layer ordered RA
  A 2-step RA or 4-step RA
  A CFRA or CBRA
  A modified PRACH procedure containing the PRACH preamble only
  RRC Reconfiguration
  MAC Control Element As an example, a PDCCH ordered CFRA can be used when one or more of the conditions in previous embodiments are met. For example, the detailed procedure can be:
  In a first step, a PDCCH is transmitted from parent IAB-DU such as via one or more of processing circuitry 34, processor 36, radio interface 32, parent unit 24, etc., to IAB-MT (i.e., IAB node 16*b*) to assign the preamble for the timing switching,
  In a second step, IAB-MT such as via one or more of processing circuitry 34, processor 36, radio interface 32, timing unit 26, etc., transmits the preamble to parent IAB-DU (i.e., parent IAB node 16*a*) with Case-1 timing (i.e., (N_TA+N_(TA,offset)) T_c, where N_TA=0, according to 3GPP TS 38.211 V16.3.0.
  In a third step, parent IAB-DU such as via one or more of processing circuitry 34, processor 36, radio interface 32, parent unit 24, etc., may respond IAB-MT with a msg2 providing a first TA adjustment and the time offset relative to a reference to indicate when Case-6 timing will be applied.
    The time offset can be expressed in number of symbols, slots or a mix of both
      Instead of providing the time offset, it can also be pre-configured in an IAB node 16 before or during deployment
      Alternatively, the time offset for the Case-1 to Case-6 timing change may be determined by a specification
    The reference can be the last symbol of RAR PDSCH
Further, in one or more sub-embodiments, when PDCCH ordered RA is used for transition from Case-1 timing to Case-6 timing, a DCI format 1-0 with CRC scrambled by C-RNTI can be used and the DCI includes one or more of the following parameters:
  Preamble ID
    E.g., when CFRA is ordered, the preamble is explicitly indicated in DCI
  Timing switching indication
    E.g., the indication can be used to tell MT to select a CBRA preamble allocated for timing switching when CBRA is ordered.

In one or more sub-embodiments, when 2-step RACH is used for transition from Case-1 timing to Case-6 timing, a normal 2-step RACH of CBRA type can be applied, and a timing switching indication can be carried in MsgA PUSCH so that parent IAB-DU such as via one or more of processing circuitry 34, processor 36, radio interface 32, parent unit 24, etc., can respond to IAB-MT with a MsgB for timing transition.

In one or more embodiments, the MsgB for timing switching can carry a timing indication to determine when the Case-6 timing will be activated.

In one or more sub-embodiments, the network (e.g., an element such as a network node 16 that may be part of access network 12) sends an RRC Reconfiguration message to the IAB MT when one or more of the conditions to switch to Case-6 are met. In this case, the network may also inform the parent IAB-DU about the switch via F1 signaling which may also carry the specific Case-6 configuration to be used or applied. The messages sent to the IAB-MT and parent IAB-DU may carry timing information, for instance, a SFN in which the configuration applies. This may help the parent IAB-DU and child IAB-MT to start the procedure in a more synchronized manner. If timing information is not provided, the parent IAB-DU may know that the child IAB-MT has initiated the procedure when the parent IAB-DU recognizes the random-access preamble which the network allocated to the child IAB-MT.

The RRC message may also indicate a random-access preamble to be used by the IAB-MT such as via one or more of processing circuitry 34, processor 36, radio interface 32, timing unit 26, etc., to perform a CFRA.

Upon reception of the RRC message by the IAB-MT such as via one or more of processing circuitry 34, processor 36, radio interface 32, timing unit 26, etc., or at the time at which the configuration is applied, the IAB-MT such as via one or more of processing circuitry 34, processor 36, radio interface 32, timing unit 26, etc., starts the random access procedure, 2-step RA or 4-step RA, CFRA or CBRA. When the RA procedure is completed, the IAB-MT such as via one or more of processing circuitry 34, processor 36, radio interface 32, timing unit 26, etc., transmits the RRC Reconfiguration Complete message to the network. The RA procedure is outlined in Example 1, below.

In a third sub-embodiment of this embodiment, the parent IAB-DU such as via one or more of processing circuitry 34, processor 36, radio interface 32, parent unit 24, etc., initiates the procedure to start the Case-6 switch with a specific MAC Control Element (CE). This MAC CE indicates for the child IAB-MT to switch to Case-6 and the MAC CE may, additionally, carry information relative to the configuration to be applied, for instance, the random access preamble to be used by the child IAB-MT. It may also carry timing information to indicate, for instance, the SFN in which the configuration applies or when the child IAB-MT should start the random access.

Upon reception of the MAC CE by the IAB-MT or at the time at which the configuration is applied, the IAB-MT would start the random access procedure, 2-step RA or 4-step RA, CFRA or CBRA. The RA procedure is outlined in Example 1, below.

In one or more sub-embodiments, when PDCCH ordered RA is used for transition from Case-1 timing to Case-6 timing for IAB-MT timing for certain IAB-MT (e.g., child IAB-MT1), then during the transition (when IAB-MT1 sends RA), the parent IAB-DU may mute transmissions from one or more other child IAB-MTs (e.g., IAB-MT). This helps to ensure that the target or intended IAB-MT (e.g., IAB-MT1) transmission arrives at the parent IAB-DU with no or minimal interference. During the muted resources, the other IAB-MTs may not be required to transmit any signal. The muting information (e.g., information of the corresponding resources) can be transmitted to the IAB-MTs or may be pre-defined (e.g., periodic muting patterns).

Case-6 Timing Adjustment Based on RA Procedure

In this section, one or more methods for adjusting the Case-6 timing based on random access procedure are described.

Figure 13:
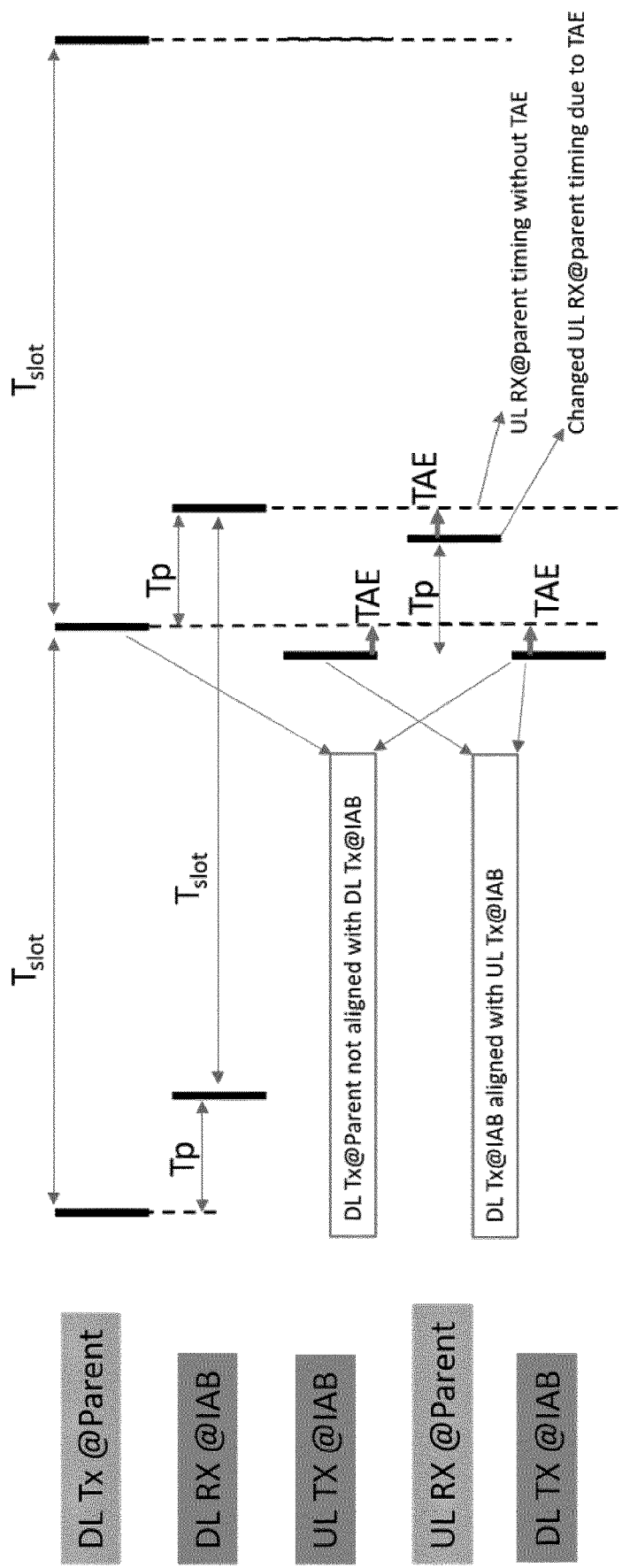
FIG. 13 is a diagram of an example of Case-6 timing mis-alignment between the parent IAB node and IAB node.

When an IAB system is already operating with Case-6 timing, there may also be a need to adjust Case-6 timing. FIG. 13 is a diagram that illustrates an example in which, in practice, the DL TX@Parent (i.e., parent IAB node 16a) and DL TX@IAB (i.e., child IAB node 16b or IAB node 16b) are difficult to fully align due to, for example, the estimation error of propagation delay Tp, or the clock differences and drift between the IAB and parent nodes. In Case-6 timing, the IAB node 16b can use DL TX@IAB to set UL TX@IAB, while a parent IAB node 16a can use DL TX@Parent to set UL RX@Parent (e.g., based on an estimate of the propagation delay Tp from RA). If the difference between DL TX@Parent and DL TX@IAB is too big such that UL RX@Parent is out of the parent IAB nodes's FFT window (e.g., outside the CP length), the parent IAB node can loosen or relax the reception timing for IAB-MT transmissions.

RA Based Case-6 Timing Adjustment Initiated by IAB-DU

After enabling the IAB-MT Case-6 timing, a parent IAB node 16a may need information about IAB-MT propagation delay (such as the latest propagation delay or information about some past delay estimations) and TAE error information in order to set its frame timing to reduce a risk that an IAB-MT signal may not be received successfully. Parent IAB-DU such as via one or more of processing circuitry 34, processor 36, radio interface 32, parent unit 24, etc., may initiate, e.g., PDCCH ordered RACH process for Case-6 IAB-MT to capture the IAB-MT signal after enabling the Case-6 timing on IAB-MT.

Example 1: Parent IAB-DU Initiated Timing Adjustment of Case-6 Timing

In one or more embodiments, the RACH based Case-6 timing adjustment is initiated according to one or more of the following:
 a number of times that the parent IAB-DU fails to receive the IAB-MT signals
  the number of times can be calculated as the number of consecutive failures; or
  the number of times can be determined as the total number of failures within a time duration
   e.g., the time duration can be one or multiple SSB to RO association periods or SSB to RO association pattern periods
 the expiry of a timer defined for the purpose of Case-6 timing adjustment
  the timer can be the timeAlignmentTimer defined for normal RA for a wireless device 22 or a IAB-MT to access the cell provided by the parent IAB node 16a; or
  the timer is a separately configured timer.
 The transmit timings, e.g., due to drift, of at least two IAB-MTs that are deviating such that the difference (in reception timing) compared to an ideal or predetermined reception timing is exceeding a threshold.

In another embodiment, the RA procedures used for Case-6 timing adjustment can be one or more of:
 PDCCH ordered RA, or higher layer ordered RA
 A 2-step RA or 4-step RA
 A modified PRACH procedure in which only the PRACH preamble is sent
 A CFRA
 MAC Control element (third embodiment from section 5.1)

RA Based Case-6 Timing Adjustment Initiated by IAB-MT

Example 2: Case-6 Timing Adjustment is Initiated by MT

In one embodiment, the RACH based Case-6 timing adjustment is initiated according to one or more of the following:
 a number of times that the parent IAB-DU such as via one or more of processing circuitry 34, processor 36, radio interface 32, parent unit 24, etc., fails to receive the IAB-MT signals
  the number of times can be calculated such as via one or more of processing circuitry 34, processor 36, radio interface 32, parent unit 24, etc., as the number of consecutive failures, or
  the number of times can be determined such as via one or more of processing circuitry 34, processor 36, radio interface 32, parent unit 24, etc., as the total number of failures within a time duration
   e.g., the time duration can be one or multiple SSB to RO association periods or SSB to RO association periods
 the expiry of a timer defined for the purpose of Case-6 timing adjustment
  the timer can be the timeAlignmentTimer defined for normal RA for a wireless device 22 or a IAB-MT to access the cell provided by the parent IAB node 16a, or
  the timer is a separately configured timer In another embodiment, the RACH based Case-6 timing adjustment is initiated when one or more of the following conditions are met:
 When the IAB-MT such as via one or more of processing circuitry 34, processor 36, radio interface 32, timing unit 26, etc., fails to receive random access response within the random access response window during RA procedure,
 When the number of retransmissions of signals by IAB-MT exceeds certain threshold, e.g., retransmissions during HARQ process, retransmission attempts during the RA procedure, etc.
 When the IAB-MT transmission timing error (Te) for transmitting uplink signals (e.g., RA, control channel, reference signal (e.g., SRS, DMRS, etc.), data channel, etc.), exceeds a certain or predefined threshold. The IAB-MT such as via one or more of processing circuitry 34, processor 36, radio interface 32, timing unit 26, etc., determines Te, e.g., based on IAB-MT DL transmission timing, e.g., based on a reference signal such as SSB, CSI-RS, etc., transmitted by IAB-MT.

In the above example, the thresholds can be pre-defined or configured by the parent IAB-DU such as via one or more of processing circuitry 34, processor 36, radio interface 32, parent unit 24, etc.

In one embodiment, only CBRA with 2-step RA type is used for fast adjustment of Case-6 timing.

With CBRA, there may be no need to reserve PRACH resources specific for the timing adjustment. With 2-step RACH, MsgA PUSCH can be used to carry information on whether the MsgA is for Case-6 timing adjustment.

As an example, a CBRA with 2-step RA type can be used for adjusting the timing where a C-RNTI MAC CE is transmitted in the MsgA PUSCH, and an Absolute Timing Advance Command MAC CE is transmitted in the MsgB in response to this MsgA, such that the case-6 timing can be adjusted according to the absolute TA.

RA Based Case-6 Timing Adjustment with Preconfigured RA Procedure

Example 3: Preconfigured Periodical RA Procedure

In one embodiment, the PRACH resources including PRACH preambles and/or the PRACH occasions can be specifically preconfigured for adjustment of the Case-6 timing periodically.

With this method, IAB-MT such as via one or more of processing circuitry 34, processor 36, radio interface 32, timing unit 26, etc., may always transmit PRACH on all PRACH occasions with a periodicity such that the timing is adjusted at least once every period.

In another embodiment, only PRACH preamble is configured.

PRACH Resource Configuration RA Based Case-6 Timing Adjustment

Example 4: The PRACH Resources Used for the Case-6 Timing Adjustment can be

A subset of the PRACH occasions and/or PRACH preambles used for IAB-MT or wireless device 22 to perform the random access for the purposes other than Case-6 timing adjustment.

Figure 14:
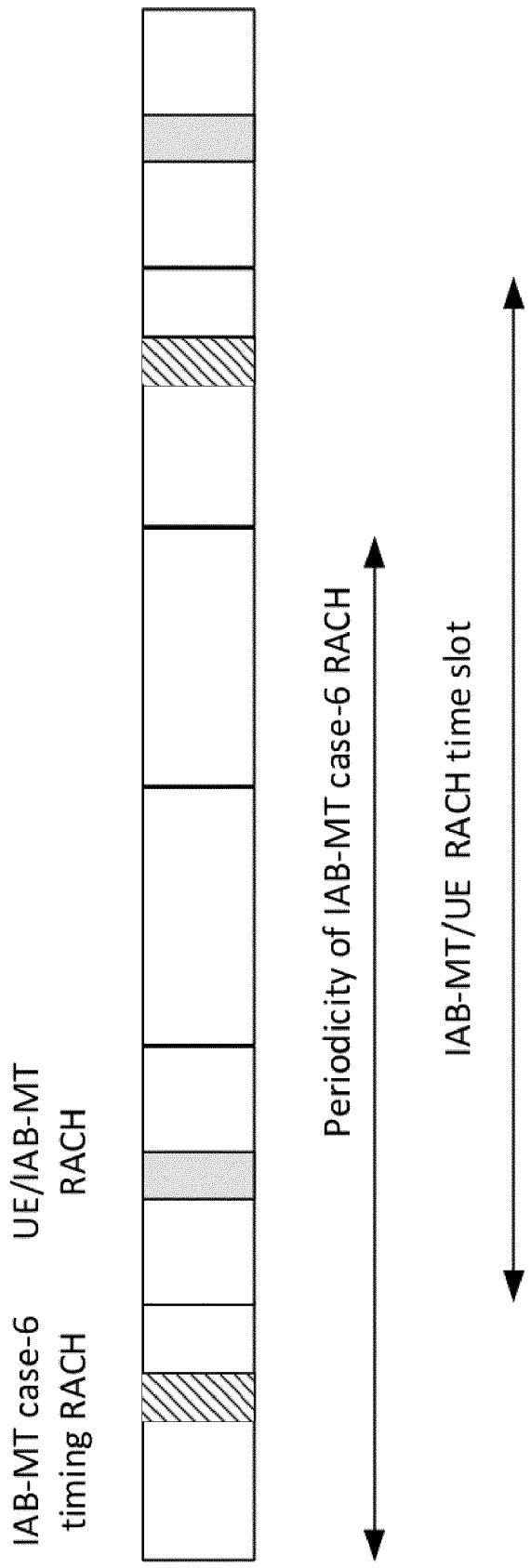
FIG. 14 is a diagram of an example PRACH configuration period for Case-6 timing IAB-MT and legacy timing wireless device/IAB-MT.

A separate PRACH configuration is configured specifically for Case-6 timing adjustment A parent IAB node 16a such as via one or more of processing circuitry 34, processor 36, radio interface 32, parent unit 24, etc., may configure the time slot in which an IAB-MT signal is to be received after enabling the Case-6 timing. Such symbols in this time slot can be either DL, UL or Flexible. The RACH slot configured for the wireless device 22 and IAB-MT may be different so IAB-MT can initiate the RACH process in the time slot where the Case-6 timing is enabled as illustrated in FIG. 14.

If a separate configuration is used, it may be possible to transmit only the PRACH preamble part without a message part.

Case-6 timing adjustment based on other methods
Downlink Measurement-Based Methods Example 5a: IAB-MT such as via one or more of processing circuitry 34, processor 36, radio interface 32, timing unit 26, etc., can periodically estimate the timing based on DL SSB and report the results of the timing difference to the parent IAB-DU for the timing adjustment. The periodicity of the report can be pre-defined (e.g., 40 ms, periodicity of SSB, etc.) or it can be configured by parent IAB-DU such as via one or more of processing circuitry 34, processor 36, radio interface 32, parent unit 24, etc. For example, the timing difference can be obtained between any two sets of DL timing measurements. In one example, timing difference can be between two successive measurements where each measurement is obtained at periodic interval, e.g., once every 40 ms. In another example, the timing difference can be between two measurements where one measurement is reference measurement and another one is obtained by the IAB-MT at periodic interval, e.g., once every 40 ms. Examples of reference measurement is average measurement, smallest measurement value in the last time period (T1), largest measurement value in the last time period (T2), etc. Based on the estimated timing difference, the parent IAB-DU such as via one or more of processing circuitry 34, processor 36, radio interface 32, parent unit 24, etc., can schedule IAB-MT with PDCCH ordered RA before the failure of uplink timing, at suitable Uplink or Flexible symbols.

Example 5b: the IAB-MT can estimate the timing based on other DL reference signals. Examples of other DL reference signals are CSI-RS, discovery signals, DMRS, etc. Similar to Example 5a, in this case as well, the IAB-MT also reports the timing difference between any two measurements periodically or when one or more conditions is met, e.g., when timing difference exceeds by certain threshold (H2).

Uplink Measurement-Based Methods

Example 6: In one embodiment, parent IAB-DU such as via one or more of processing circuitry 34, processor 36, radio interface 32, parent unit 24, etc., can periodically estimate the timing based on UL reference signals. Based on the estimated timing difference, the parent IAB-DU such as via one or more of processing circuitry 34, processor 36, radio interface 32, parent unit 24, etc., can schedule IAB-MT with PDCCH ordered RA before the failure of uplink timing, at suitable Uplink or Flexible symbols.

For example, a periodical SRS signal and corresponding resources can be configured for the adjustment of the estimated propagation delay to be used for the reception of UL TX signals from IAB MT in case of case-6 timing. The SRS can be transmitted with zero TA, so that the estimated TA on the DU side (i.e., parent IAB node 16a) can be treated as a new RTT time and a latest propagation delay can be derived.

In another example, the parent IAB-DU such as via one or more of processing circuitry 34, processor 36, radio interface 32, parent unit 24, etc., may estimate the uplink signal quality (e.g., SINR, SNR, BLER, etc.) of the uplink signals transmitted by the IAB-MT. The uplink signal quality estimation may be part of normal UL reception process, e.g., decoding of UL control channel, UL data channel, etc. If the signal quality falls below a threshold (H3) (e.g., SINR is below H3) then the parent IAB-DU such as via one or more of processing circuitry 34, processor 36, radio interface 32, parent unit 24, etc., initiates scheduling the IAB-MT with PDCCH ordered RA before the failure of uplink timing occurs.

In another example, estimating of the timing may start based on UL reference signals (e.g., periodically) when the uplink signal quality falls below certain threshold, e.g., when SINR is below predefined threshold H4. In this way, the parent IAB-DU does not need to periodically estimate the UL timing all the time, e.g., reducing processing in the parent IAB-DU.

GNSS-Based Methods

Example 7: In one embodiment, IAB-MT such as via one or more of processing circuitry 34, processor 36, radio interface 32, timing unit 26, etc., periodically reports the GNSS position to the parent IAB-DU, and the parent IAB-DU such as via one or more of processing circuitry 34, processor 36, radio interface 32, parent unit 24, etc., calculates the delay periodically based on the GNSS position.

Based on the estimated delay, to possibly get a more accurate updated delay, the parent IAB-DU such as via one or more of processing circuitry 34, processor 36, radio interface 32, parent unit 24, etc., can trigger the IAB-MT with PDCCH ordered RA before the failure of uplink timing.

On the other hand, if the estimated delay is accurate enough, it can be used directly for setting UL RX timing on the parent IAB-DU.

Extended CP

Example 8: In one embodiment, Case-6 timing can apply extended CP in NR release 15 (R15)/R16 or a separately defined extended Cyclic Prefix (CP) to extend the FFT window of the IAB-DU receiver and prevent the failure of the uplink timing.

Grouping of IAB-MTs

Example 9: Since different MTs connected to the same parent IAB node 16*a* may have different propagation paths and hence different propagation delays, not all MTs may be able to communicate with the parent IAB-DU and still keep their respective DL transmission timing aligned to the rest of the network with some margin, e.g., ±1.5 μs. IAB-MT and IAB-DU transmissions within a node are typically synchronized. In that case, the parent IAB-DU such as via one or more of processing circuitry 34, processor 36, radio interface 32, parent unit 24, etc., may allocate its child IAB-MTs into subsets, such that child IAB-MTs with the same subset may be received simultaneously on specified time slot while still respective child IAB-DU transmission may be aligned to the network.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A parent network node configured to communicate with a network node, the parent network node comprising processing circuitry configured to:
enable a first timing configuration, the first timing configuration enabling downlink transmission timing for the network node to be aligned with the downlink transmission timing of the parent network node; and
based on the first timing configuration, switch to a second timing configuration, the second timing configuration enabling uplink transmission timing of the network node to be aligned with the downlink transmission timing of the network node; and
before enabling the second timing configuration:
determine whether to switch to the second timing configuration; and
initiate a random access channel process to be performed to capture signaling from the network node before the enabling of the second timing configuration.

2. The parent network node of claim 1, wherein the processing circuitry is further configured to:
determine to switch to the second timing configuration when one or more of the following requirements are met:
a timing advance (TA) variation is no larger than a predetermined threshold;
a guard symbol configuration for IAB in each slot;
a propagation delay between the parent network node and the network node is not or has not changed so that changes of first timing configuration and the second timing configuration allows for one or more criteria;
a signal level or signal quality measure during reception of signals from Mobile Termination (MT) to Distributed Unit (DU) is above a threshold value; and
a backhaul traffic situation and requirements.

3. The parent network node of claim 2, wherein the one or more criteria comprise at least one of:
timing changes are within a limit;
changes of TA are within a limit; and
changes of guard symbol configuration are within a limit.

4. The parent network node of claim 1, wherein the random access channel process is one or more of:
a Physical Downlink Control Channel (PDCCH) ordered random access (RA), or higher layer ordered RA;
a 2-step RA or 4-step RA;
a Contention Free RA (CFRA) or Contention Based RA (CBRA); and
a modified Physical Random Access Channel (PRACH) procedure containing a PRACH preamble only.

5. The parent network node of claim 1, wherein the random access channel process is initiated by at least one of:
a Downlink Control Information (DCI);
a Radio Resource Control (RRC) Reconfiguration; and
a Medium Access Control (MAC) Control Element (CE).

6. The parent network node of claim 1, wherein the enabling of the second timing configuration corresponds to a switch from the first timing configuration to the second timing configuration.

7. The parent network node of claim 1, wherein the processing circuitry is further configured to, after enabling the second timing configuration, adjust the downlink transmission timing and uplink transmission timing and uplink reception timing.

8. The parent network node of claim 7, wherein the adjustment of the second timing configuration is based on at least one of:
an estimated timing difference based on downlink SSB;
an estimated timing based on downlink reference signals;
an estimated timing based on uplink reference signals; and
a reported Global Navigation Satellite System, GNSS, position for calculation of delay between the parent network node and the network node.

9. The parent network node of claim 1, wherein the adjusting of the second timing configuration is initiated according to one or more of:
a number of times that the parent network node fails to receive signals from the network node;
the expiry of a timer defined for the purpose of a second timing adjustment; and
the transmit timings of at least two network nodes that are deviating such that the difference in reception timing compared to an ideal or predetermined reception timing is exceeding a threshold.

10. The parent network node of claim 1, wherein the first timing configuration corresponds to Case-1 timing and the second timing configuration corresponds to Case-6 timing.

11. A network node configured to communicate with a parent network node, the network node comprising processing circuitry configured to:
switch from a first timing configuration to a second timing configuration, the first timing configuration enabling downlink transmission timing of the network node to be aligned with the downlink transmission timing of the parent network node, the second timing configuration enabling uplink transmission timing for timing alignment with the downlink transmission timing of the network node; and
before switching to the second timing configuration:
receive an indication to perform random access channel process; and
cause signaling based at least on performing the random access channel process, the signaling configured to be captured by the parent network node before the switching to the second timing configuration.

12. The network node of claim 11, wherein the random access channel process is one or more of:
a Physical Downlink Control Channel (PDCCH) ordered random access (RA), or higher layer ordered RA;
a 2-step RA or 4-step RA;
a Contention Free RA (CFRA) or Contention Based RA (CBRA); and
a modified Physical Random Access Channel (PRACH) procedure containing a PRACH preamble only.

13. The network node of claim 11, wherein the adjusting of the second timing configuration is initiated according to one or more of:
a number of times that the parent network node fails to receive signals from the network node; and
the expiry of a timer defined for the purpose of the second timing configuration adjustment.

14. A method implemented by a parent network node configured to communicate with a network node, the method comprising:
enabling a first timing configuration, the first timing configuration enabling downlink transmission timing for the network node to be aligned with the downlink transmission timing of the parent network node; and based on the first timing configuration, switching to a second timing configuration, the second timing configuration enabling uplink transmission timing of the network node to be aligned with the downlink transmission timing of the network node; and before enabling the second timing configuration:
- determining whether to switch to the second timing configuration; and
- initiating a random access channel process to be performed to capture signaling from the network node before the enabling of the second timing configuration.

15. The method of claim 14, wherein the determining of whether to switch to the second timing configuration comprises:
determining to switch to the second timing configuration when one or more of the following requirements are met:
- a TA variation is no larger than a predetermined threshold;
- a guard symbol configuration for IAB in each slot;
- a propagation delay between the parent network node and the network node is not or has not changed so that changes of the first timing configuration and the second timing configuration allows for one or more criteria;
- a signal level or signal quality measure during reception of signals from MT to DU is above a threshold value; and
- a backhaul traffic situation and requirements.

16. The method of claim 15, wherein the one or more criteria comprise at least one of:
- timing changes are within a limit;
- changes of TA are within a limit; and
- changes of guard symbol configuration are within a limit.

17. The method of claim 14, wherein the adjusting of the second timing configuration is initiated according to one or more of:
- a number of times that the parent network node fails to receive signals from the network node;
- the expiry of a timer defined for the purpose of the second timing configuration adjustment; and the transmit timings of at least two network nodes that are deviating such that the difference in reception timing compared to an ideal or predetermined reception timing is exceeding a threshold.

18. A method implemented by a network node configured to communicate with a parent network node, the method comprising:
switching from a first timing configuration to a second timing configuration, the first timing configuration enabling downlink transmission timing of the network node to be aligned with the downlink transmission timing of the parent network node, and the second timing configuration enabling uplink transmission timing alignment with the downlink transmission timing of the network node; and before switching to the second timing configuration:
- receiving an indication to perform random access channel process; and
- causing signaling based at least on performing the random access channel process, the signaling configured to be captured by the parent network node before the switching to the second timing configuration.

19. The method of claim 18, wherein the random access channel process is one or more of:
- a Physical Downlink Control Channel (PDCCH) ordered random access (RA), or higher layer ordered RA;
- a 2-step RA or 4-step RA;
- a Contention Free RA (CFRA) or Contention Based RA (CBRA); and
- a modified Physical Random Access Channel procedure containing a PRACH preamble only.

20. The method of claim 18, wherein the adjusting of the second timing configuration is initiated according to one or more of:
- a number of times that the parent network node fails to receive signals from the network node; and
- the expiry of a timer defined for the purpose of the second timing configuration adjustment.

\* \* \* \* \*